United States Patent
Potson et al.

(10) Patent No.: US 6,320,431 B1
(45) Date of Patent: Nov. 20, 2001

(54) APPARATUS AND METHOD OF GENERATING NUMERICALLY CONTROLLED OSCILLATOR SIGNALS

(75) Inventors: David Potson, Fort Collins; Mark F. Rives, Berthoud, both of CO (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/430,849

(22) Filed: Nov. 1, 1999

Related U.S. Application Data
(60) Provisional application No. 60/158,695, filed on Oct. 8, 1999.

(51) Int. Cl.⁷ .................................................... H03B 21/00
(52) U.S. Cl. ...................... 327/106; 327/129; 327/113; 327/107; 331/61; 708/270; 708/276
(58) Field of Search ........................ 327/105, 106, 327/107, 113, 129–131, 135, 140, 291, 119–122; 708/200, 270, 271–276, 440, 441; 331/45, 60, 61

(56) References Cited

U.S. PATENT DOCUMENTS

| | | |
|---|---|---|
| 4,327,420 * | 4/1982 | Gdula et al. ........................... 708/276 |
| 4,486,846 | 12/1984 | McCallister et al. ..................... 708/8 |
| 4,635,279 | 1/1987 | Nossen .................................. 375/322 |
| 4,694,417 | 9/1987 | Cantwell .............................. 708/605 |
| 4,740,995 | 4/1988 | Schevin et al. ....................... 375/296 |
| 4,809,205 | 2/1989 | Freeman ................................ 708/276 |
| 4,845,436 | 7/1989 | Kobayashi et al. .................. 370/542 |
| 4,855,946 | 8/1989 | Ruben et al. ......................... 708/276 |
| 4,905,177 | 2/1990 | Weaver, Jr. et al. ................. 708/276 |
| 5,073,869 | 12/1991 | Bjerede ................................ 708/271 |
| 5,113,361 * | 5/1992 | Damerow et al. ................... 708/276 |
| 5,631,586 | 5/1997 | Sogo .................................... 327/106 |
| 5,673,212 | 9/1997 | Hansen ................................ 708/271 |

* cited by examiner

*Primary Examiner*—Timothy P. Callahan
*Assistant Examiner*—Minh Nguyen
(74) *Attorney, Agent, or Firm*—Girard & Equitz LLP

(57) ABSTRACT

An apparatus according to a preferred embodiment of the present invention includes two memories each storing different octants of a sine (or cosine) waveform. The sine and cosine waveforms may be concurrently generated by alternately accessing each memory in succession. It is unnecessary to access one memory concurrently, so that both waveforms may be concurrently generated without requiring either two accesses to the same memory or a doubled memory size.

31 Claims, 6 Drawing Sheets

APPARATUS AND METHOD OF GENERATING NUMERICALLY CONTROLLED OSCILLATOR SIGNALS

CROSS-REFERENCE TO RELATED APPLICATION

The present non-provisional application claims the benefit under 35 U.S.C. §119(e) of the provisional application having application No. 60/158,695 and filed on Oct. 8, 1999.

BACKGROUND OF THE INVENTION

1. Field of the Invention

The present invention relates to numerically controlled oscillators. In particular, the invention relates to multifunctional numerically controlled oscillators that concurrently generate more than one waveform.

2. Description of the Related Art

FIG. 1 shows an example of how a cosine waveform may be stored for retrieval and reproduction by a circuit device. A cosine waveform 28 may be stored as a plurality of stored numerical cosine values 30. The quantity of stored numerical cosine values 30 may be increased as desired for more accurate representation of the cosine waveform 28. The cosine waveform 28 is periodic, so a periodic cosine signal may be reproduced by generating a signal having amplitudes corresponding to the stored numerical cosine values 30.

Because the cosine waveform 28 is symmetric, it is not necessary to store all of the stored numerical cosine values. One period of the cosine waveform 28 may be divided into four quadrants 20, 22, 24 and 26. Only the stored numerical cosine values 30 that are in the first quadrant 20 must be stored. To produce the stored numerical cosine values 30 in the second quadrant 22, the values of the first quadrant 20 may be used, but in reverse order and with a sign change. To produce the stored numerical cosine values 30 in the third quadrant 24, the values of the first quadrant 20 may be used, but with a sign change. To produce the stored numerical cosine values 30 in the fourth quadrant 26, the values of the first quadrant 20 may be used, but in reverse order. Thus, only one-fourth of the stored numerical cosine values 30 must be stored in memory, which reduces the amount of memory required.

However, issues arise when a user would like more than one similar waveform to be generated concurrently; for example, if a sine waveform 32 having the same period is desired in addition to the cosine waveform. Such a sine waveform is merely the cosine waveform 28 with a phase shift of one quadrant. Therefore, it is not theoretically required to store any more values than the stored numerical cosine values in one quadrant (e.g., the first quadrant 20).

However, when putting the theory into practice, a number of concerns arise. Since two waveforms are desired, the memory containing the stored numerical values 30 must be accessed twice for each output cycle. One way to access two values at once is to provide a second memory containing duplicate values, and to access each memory on each output cycle. However, this doubles the amount of memory required. A second potential solution is to use only one memory, but to access it with a doubled clock speed. This effectively accesses two of the stored numerical values on each output cycle. However, the technology used may not allow the memory to operate at twice the clock speed, or there may be a penalty of increased power for operating the memory at twice the speed.

Therefore, there is a need to generate multiple similar waveforms (e.g., a sine and a cosine) without additional memory or clocking requirements.

SUMMARY OF THE INVENTION

The present invention addresses these and other problems of the prior art by providing an apparatus for and method of generating numerically controlled oscillator signals.

According to one embodiment, an apparatus according to the present invention includes a plurality of storage elements, at least one selector circuit, and at least one inverter circuit. The plurality of storage elements is configured to store a plurality of values corresponding to a portion of a periodic waveform and to receive an addressing signal, and in accordance therewith generate a plurality of first output signals, wherein each of the plurality of storage elements is configured to generate one of the plurality of first output signals corresponding to an addressed one of the plurality of values. The at least one selector circuit is coupled to the plurality of storage elements and is configured to receive at least one select signal and the plurality of first output signals, and in accordance therewith generate a plurality of second output signals, wherein each of said plurality of second output signals corresponds to a selected one of the plurality of first output signals. The at least one inverter circuit is coupled to the at least one selector circuit and is configured to receive the plurality of second output signals and a plurality of polarity signals, and in accordance therewith generate a plurality of final output signals, wherein each of said plurality of final output signals corresponds to one of the plurality of second output signals and to the periodic waveform.

According to another embodiment, a method according to the present invention includes the steps of storing a plurality of values corresponding to a portion of a periodic waveform; and receiving an addressing signal and in accordance therewith generating concurrently a plurality of first output signals, wherein each of the plurality of first output signals corresponds to an addressed one of the plurality of values. The method further includes the step of receiving at least one select signal and in accordance therewith generating a plurality of second output signals, wherein each of the plurality of second output signals corresponds to a selected one of the plurality of first output signals. The method still further includes the step of receiving a plurality of polarity signals and in accordance therewith generating a plurality of final output signals, wherein each of the plurality of final output signals corresponds to one of the plurality of second output signals and to the periodic waveform.

A better understanding of the features and advantages of the present invention will be obtained by reference to the following detailed description and accompanying drawings which set forth illustrative embodiments in which the principles of the invention are utilized.

DETAILED DESCRIPTION OF THE PREFERRED EMBODIMENTS

Figure 1:
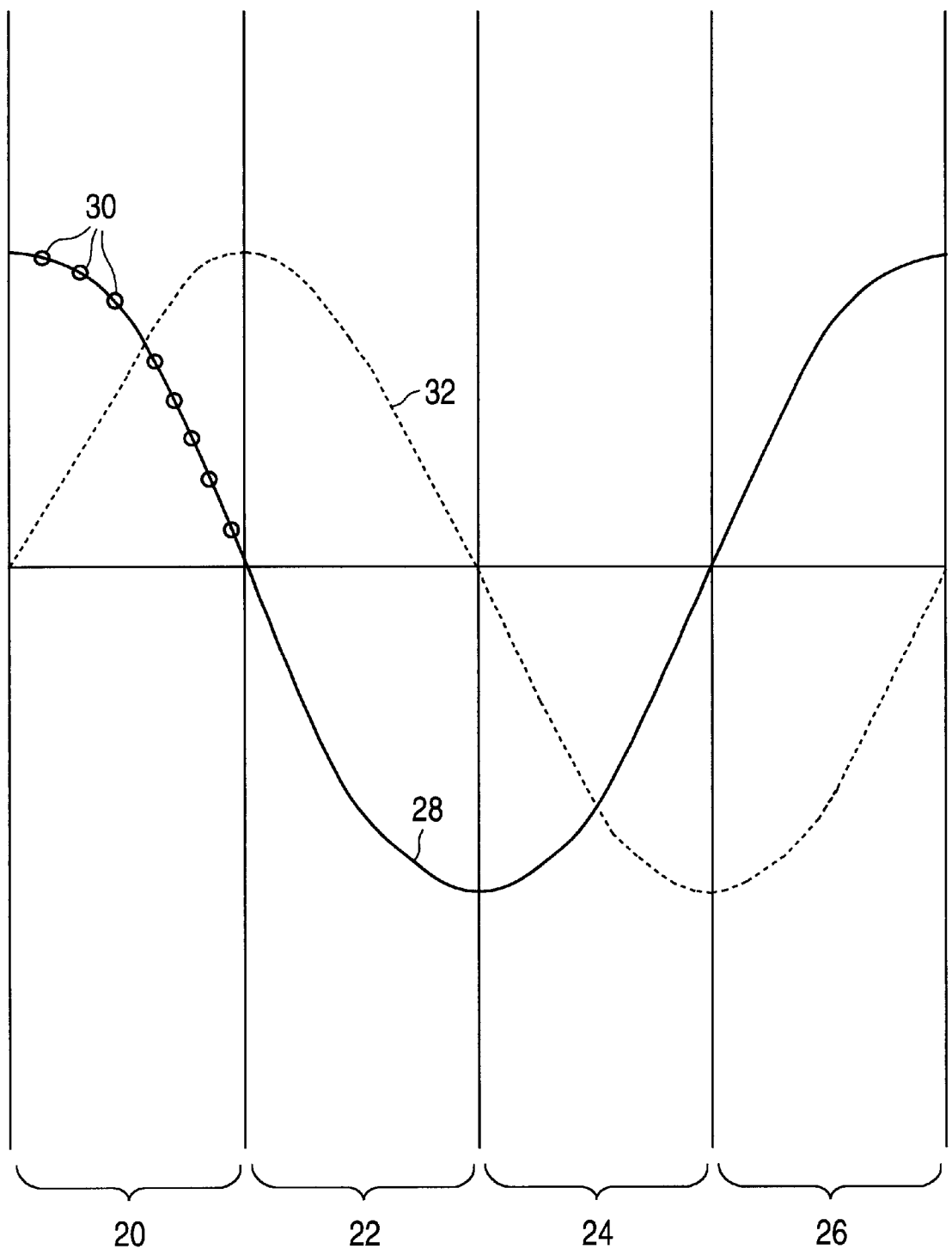
FIG. 1 is a phase diagram showing one period of a sine waveform and a cosine waveform divided into quadrants.
Figure 2:
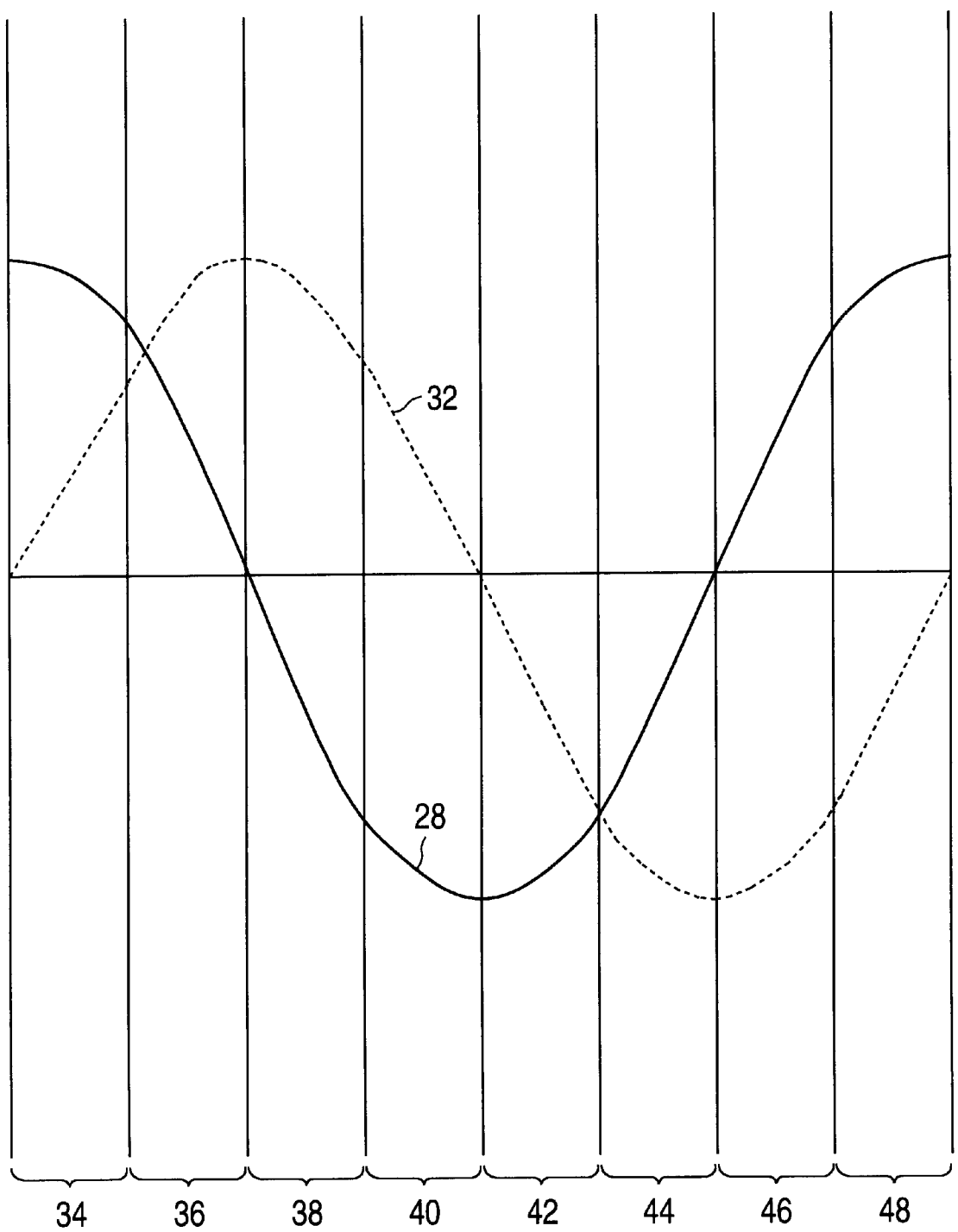
FIG. 2 is a phase diagram showing one period of the sine waveform and the cosine waveform divided into octants.

FIG. 2 shows that the cosine waveform 28 and the sine waveform 32 may be divided into eight octants 34, 36, 38, 40, 42, 44, 46 and 48. The values of one octant (e.g., one of octants 34, 40, 42 and 48) may be stored in one memory, the values of another octant (e.g., one of octants 36, 38, 44 and 46) may be stored in another memory. To generate the cosine waveform 28, accesses to the first, then second, memories are alternated and appropriate sign changes are performed. To generate concurrently (e.g., at the same time or on the same clock pulse) the sine waveform 32, accesses to the second, then first, memories are alternated and appropriate sign changes are performed. In this manner, the cosine output is generated from one memory while the sine output is concurrently generated from the other memory. Thus, the values of only one-fourth of the period of the waveform need be stored, yet two outputs (e.g., sine and cosine) may be concurrently generated without requiring a doubled clock speed.

Figure 3:
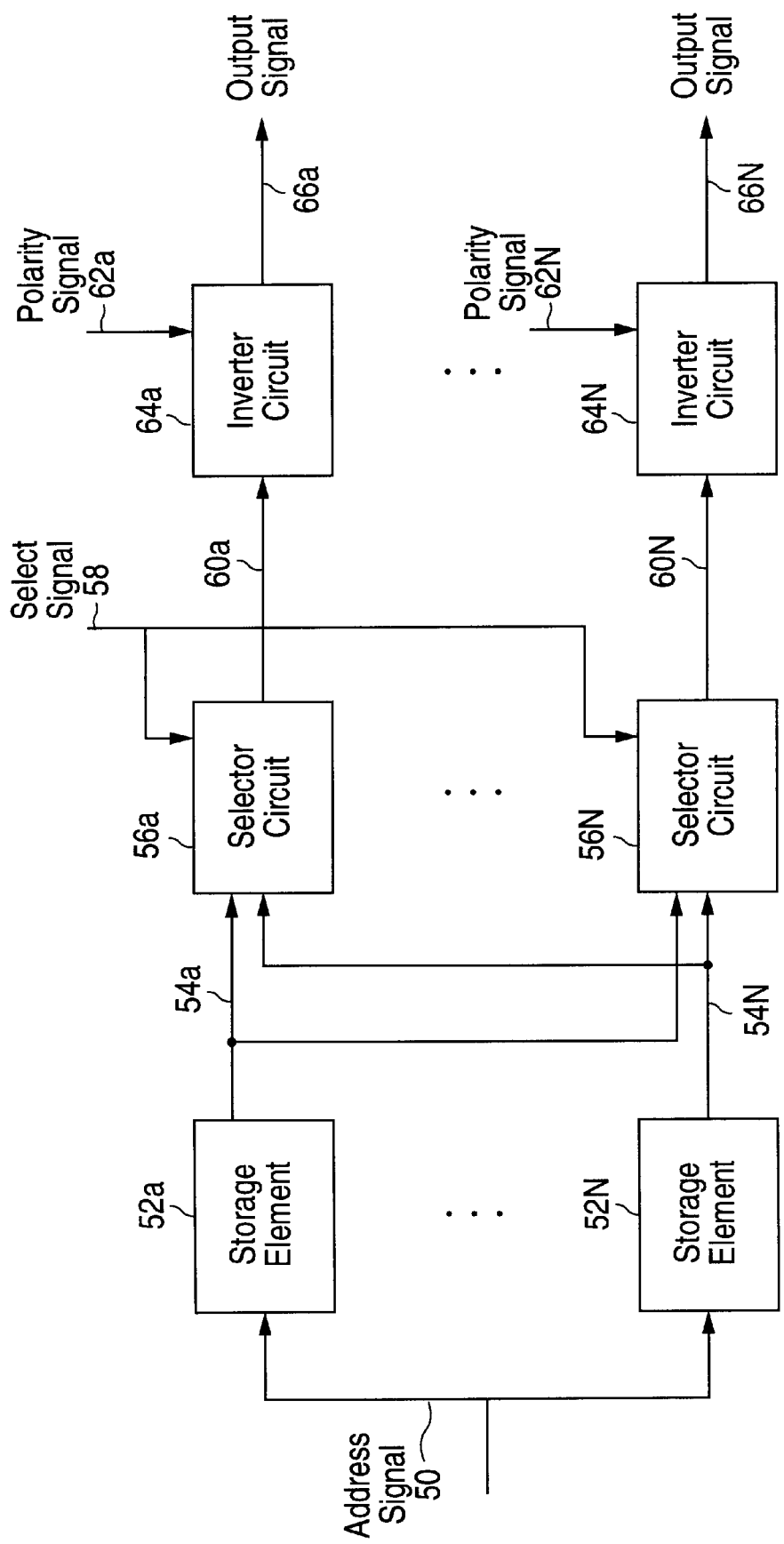
FIG. 3 is a block diagram of a circuit according to a general embodiment of the present invention.

FIG. 3 shows an overall block diagram of a circuit implementing an embodiment of the present invention. The numerical values (corresponding to a portion of the cosine waveform 28 for example) are stored in storage elements 52a–52N (collectively, storage elements 52). An address signal 50 selects which of the stored numerical values each storage element 52a–52N is to output. One address signal may be provided to the storage elements 52, or each storage element may receive its own address signal. One address signal may be used when the numerical values are stored in the same addresses in the storage elements 52 in the order they are to be accessed. (This is demonstrated in the embodiment of FIG. 4.)

Each storage element 52a–52N outputs one of output signals 54a–54N in accordance with the address signal 50. Selector circuits 56a–56N (collectively, selector circuit 56) receive the output signals 54a–54N and a select signal 58. The select signal 58 selects which of output signals 54a–54N each selector circuit 56a–56N is to output as output signals 60a–60N. A single selector circuit 56 may be used, in which case it should be able to generate the required number of output signals 60a–60N. One select signal may be provided to the selector circuit 56, or each selector circuit 56a–56N may receive its own select signal.

Inverter circuits 64a–64N (collectively, inverter circuit 64) receive the output signals 60a–60N and polarity signals 62a–62N (collectively, polarity signals 62). The polarity signals 62 determine whether the output signals 60a–60N are to be inverted to generate output signals 66a–66N. A single inverter circuit 64 may be used, in which case it should be able to generate the required number of output signals 66a–66N. One polarity signal may be provided to the inverter circuit 64, or each inverter circuit 64a–64N may receive its own polarity signal. The inverter circuit 64 may instead be coupled between the storage elements 52 and the selector circuit 56.

Figure 4:
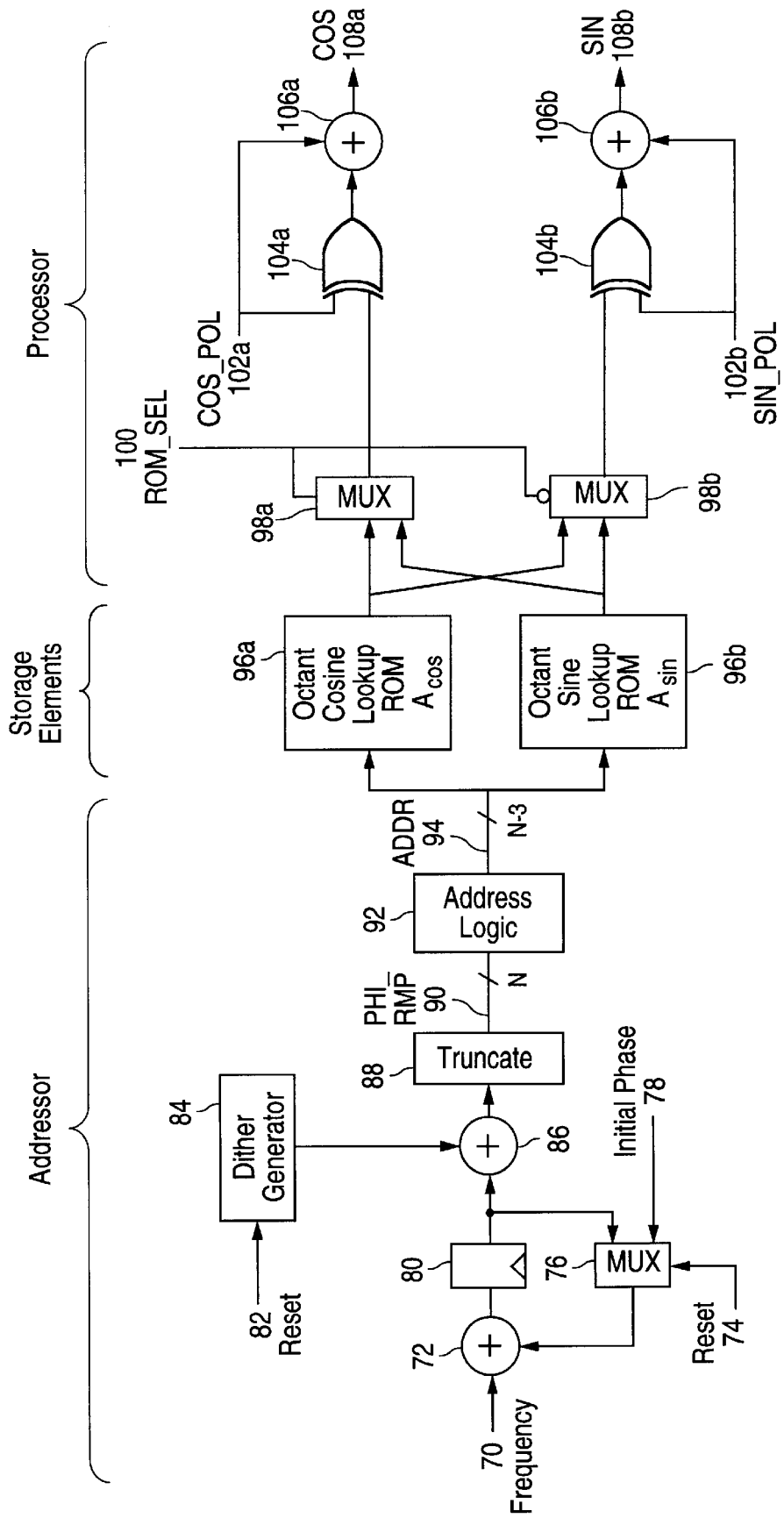
FIG. 4 is a block diagram of a preferred embodiment of the present invention.

FIG. 4 shows a preferred circuit embodiment configured to generate concurrent sine and cosine signals, while still storing only one-quarter of a period of the numerical values, and without requiring a doubled memory or doubled clock speed. The ROMs 96a and 96b shown in FIG. 4 are sometimes referred to herein as storage elements. The circuitry for generating signal ADDR used to read the storage elements 96a and 96b is sometimes collectively referred to herein as the addressor. Finally, the circuitry for processing the outputs of the storage elements 96a and 96b to provide the concurrent sine and cosine signals is sometimes collectively referred to herein as the processor.

A frequency signal 70 sets the frequency of the sine and cosine waveforms to be generated. The frequency signal 70 is a numerical value that may be fixed or time varying. The result of an adder 72 is stored in a memory element 80 to provide accumulated phase information. This value is returned to the adder 72 through a multiplexer 76 so that the phase will continuously increment. The multiplexer 76 allows a phase offset to be loaded into the memory element 80 as an initial condition. Normal operation occurs when the memory element 80 is connected to the adder 72 through the multiplexer 76. At initialization, a reset signal 74 selects the output from the multiplexer 76.

The output from the memory element 80 is combined by an adder 86 with an output from a dither generator 84. The dither generator 84 is reset by a reset signal 82. The dither generator 84 is not required, but it reduces the spurious tones due to truncation of the phase word by a truncator circuit 88. There is a trade-off between memory size and phase precision. More phase precision allows finer frequency control but will increase the size of the memory required. Truncation allows retention of the frequency resolution while reducing the memory size. However, if a signal is truncated in a repetitive fashion, it will generate an undesired spurious tone. The adder 86 combines the signal from the dither generator 84 with the signal from the memory element 80 to randomize these repetitive errors. This reduces undesired spurious signal levels at the cost of signal-to-noise ratio (SNR).

The combination of the memory element 80, the adder 72, and the multiplexer 76 feeding back between the memory element 80 and the adder 72 may be referred to as a phase accumulator. The frequency signal 70 is added to the phase accumulator every clock cycle (preferably) to advance the phase by the required amount for a particular output signal frequency.

The output of the adder 86 is truncated by the truncator circuit 88 by removing the lower order bits to generate an N-bit PHI_RMP signal 90. The value of N determines the number of possible phase values in a waveform period where the number of possible values is $2^N$. An address circuit 92 receives the PHI_RMP signal 90 and truncates the three most significant bits to generate an (N–3)-bit ADDR signal 94.

The width of the memory element 80, the adder 72, the multiplexer 76, and the adder 86 may all be the same bit width which is greater than N. The bit width of the adder 86 is truncated to produce the PHI_RMP signal 90 to allow the use of smaller memory elements for storing the waveform values.

The ADDR signal 94 is received by an octant cosine lookup memory 96a and an octant sine lookup memory 96b. In this embodiment, the octant cosine lookup memory 96a stores the numerical values of the cosine waveform in the first octant 34 (see FIG. 2). The octant sine lookup memory 96b stores the numerical values of the sine waveform in the fist octant 34 (or equivalently, the numerical values of the cosine waveform in the second octant 36 but in reverse order). As such, only one ADDR signal 94 needs to be generated because it can be used for addressing both memories 96a and 96b.

The octant cosine lookup memory 96a and the octant sine lookup memory 96b each output one of the stored numerical values corresponding to the ADDR signal 94. These outputs and a select signal 100 are provided to multiplexers 98a and 98*b*. Based on the select signal 100, the multiplexers 98*a* and 98*b* each output one of the stored numerical values from the lookup memories 96*a* and 96*b*. The outputs from the multiplexers 98*a* and 98*b* are provided to XOR gates 104*a* and 104*b*.

The XOR circuit 104*a* receives a cosine polarity signal 102*a*, and the XOR circuit 104*b* receives a sine polarity signal 102*b*. The XOR circuits 104*a* and 104*b* then perform an XOR operation on the outputs from the multiplexers 98*a* and 98*b* and the polarity signals 102*a* and 102*b*. The XOR operation is performed between the polarity signal and each bit individually of the respective multiplexer output. A "0" sign bit is appended to the outputs from the multiplexers 98*a* and 98*b* as described below in order to produce data in two's complement format to simplify mathematical operations. Adder circuits 106*a* and 106*b* combine the outputs from the XOR circuits 104*a* and 104*b* with the polarity signals 102*a* and 102*b* (effectively performing a two's complement inversion) to generate the cosine output signal 108*a* and the sine output signal 108*b*.

Figure 5:
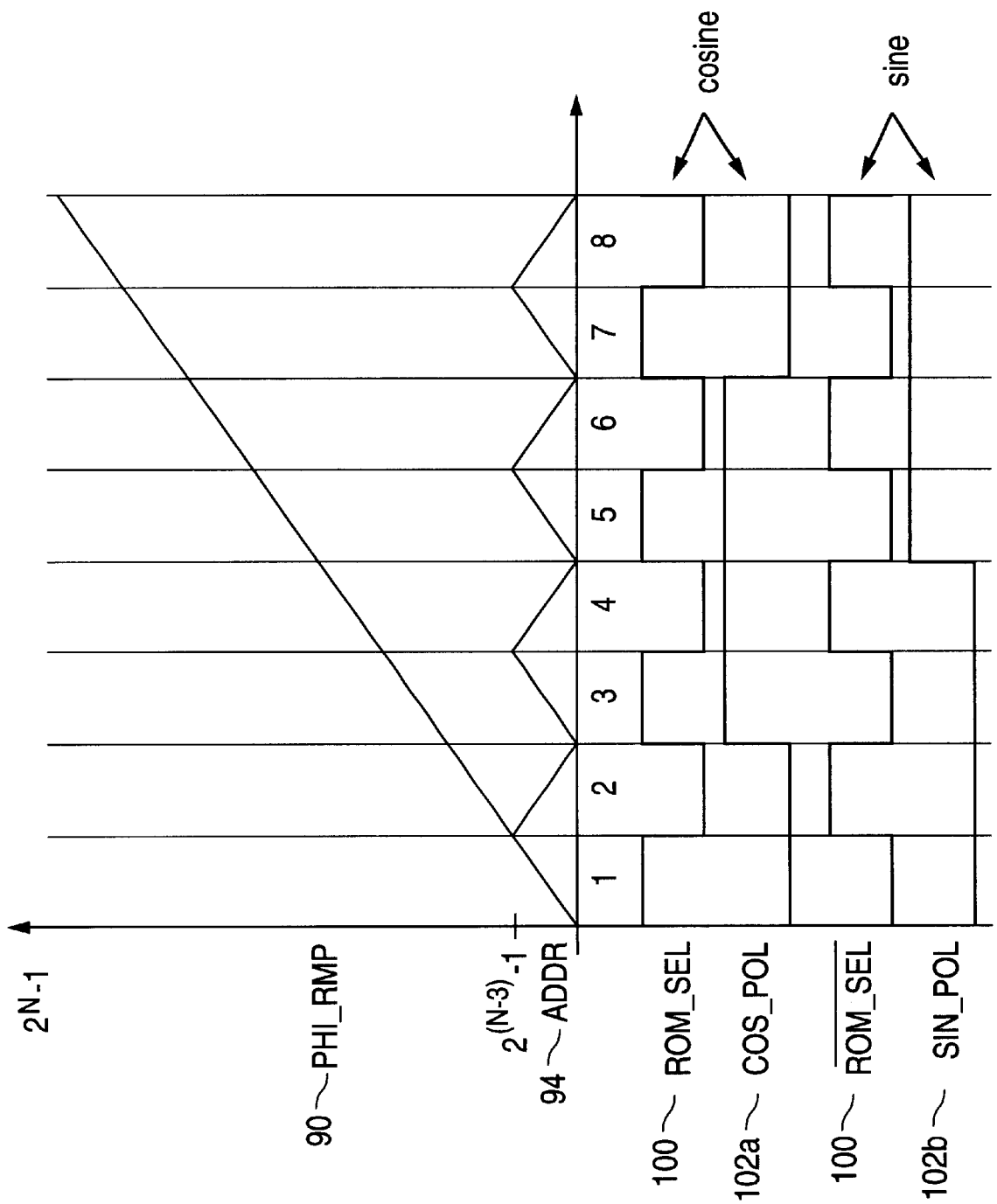
FIG. 5 is a timing diagram showing various signals of FIG. 4.

FIG. 5 shows the various signals generated over one period of sine and cosine waveforms produced. The PHI_RMP signal 90 increases from zero to $2^N-1$ over the period. The ADDR signal 94 ramps between zero and $2^{(N-3)}-1$ over the period.

The select signal 100 alternates between high and low for each octant. In effect, the select signal 100 causes the multiplexer 98*a* to output the numerical values from the octant cosine lookup memory 96*a* for the odd octants 34, 38, 42 and 46 (see FIG. 2), and to output the numerical values from the octant sine lookup memory 96*b* for the even octants 36, 40, 44 and 48. The inverse of the select signal 100 causes the multiplexer 98*b* to output the numerical values from the octant sine lookup memory 96*b* for the odd octants 34, 38, 42 and 46, and to output the numerical values from the octant cosine lookup memory 96*a* for the even octants 36, 40, 44 and 48.

The cosine polarity signal 102*a* alternates between high and low, being low when the cosine waveform 28 (see FIG. 2) is to be positive and high when it is to be negative. The sine polarity signal 102*b* likewise alternates, being low when the sine waveform 32 is to be positive and high when it is to be negative.

As a result, the cosine waveform 28 and the sine waveform 32 may be concurrently generated without requiring an increased memory size or clock speed.

Specifically, to generate the waveforms in the first octant 34 (see FIG. 2), the ADDR signal 94 causes the cosine memory 96*a* to output its numerical values, and causes the sine memory 96*b* to output its numerical values (which correspond to the values in the second octant 36 of the cosine waveform 28 in reverse order). The select signal 100 causes the multiplexer 98*a* to output the values from the cosine memory 96*a*, and causes the multiplexer 98*b* to output the values from the sine memory 96*b*. The cosine polarity signal 102*a* causes the XOR circuit 104*a* and adder circuit 106*a* to output the output from the multiplexer 98*a*, and the sine polarity signal 102*b* causes the XOR circuit 104*b* and adder circuit 106*b* to output the output from the multiplexer 98*b*.

Then, to generate the waveforms in the second octant 36, the ADDR signal 94 causes the cosine memory 96*a* to output its numerical values in reverse order, and causes the sine memory 96*b* to output its numerical values in reverse order (effectively un-reversing the stored reversed values in the second octant 36 of the cosine waveform 28). The select signal 100 causes the multiplexer 98*a* to output the values from the sine memory 96*b*, and causes the multiplexer 98*b* to output the values from the cosine memory 96*a*. The cosine polarity signal 102*a* causes the XOR circuit 104*a* and the adder circuit 106*a* to output the output from the multiplexer 98*a*, and the sine polarity signal 102*b* causes the XOR circuit 104*b* and the adder circuit 106*b* to output the output from the multiplexer 98*b*.

Similar descriptions may be provided for the third through eighth octants (with the polarity signals 102*a* and 102*b* inverting the outputs from the multiplexers 98*a* and 98*b* as necessary), but are omitted for brevity.

The numerical values stored in the memories 96*a* and 96*b* may be calculated as follows:

$$A_{\cos} = Rnd\left[(2^M - 1)\cos\left(2\pi \frac{n+0.5}{2^N}\right)\right]$$

$$A_{\sin} = Rnd\left[(2^M - 1)\sin\left(2\pi \frac{n+0.5}{2^N}\right)\right]$$

where $A_{cos}$ are the values to be placed in the octant cosine memory 96*a*, $A_{sin}$ are the values to be placed in the octant sine memory 96*b*, M is the number of bits in the desired amplitude resolution, N is the number of bits in the desired phase resolution, and $n=0, 1, \ldots, 2^{(N-3)}-1$.

For this embodiment, only M−1 amplitude bits need to be stored because the cosine and sine waveforms are positive valued in the first and second octants. A zero sign bit may be appended to the output from the memories 96*a* and 96*b* prior to the XOR circuits 104*a* and 104*b* that are controlled by the polarity signals 102*a* and 102*b*.

The value of 0.5 is added to n in the above equations so that the phase sample values do not fall on the octant boundaries. This is one way of ensuring that each cosine and sine waveform is produced from only one memory at a time and that the same memory does not have to be accessed when generating both cosine and sine waveforms.

Similar embodiments may be implemented when three symmetric signals are desired. For example, to generate three cosine waveforms separated by a phase shift of 60 degrees, three memories are used and one period of the waveform is divided into 12 phases. In such an embodiment the address circuitry becomes more complex, and an increased number of select signals and polarity signals may be used depending upon the additional selector and inverter circuitry implemented.

Figure 6A:
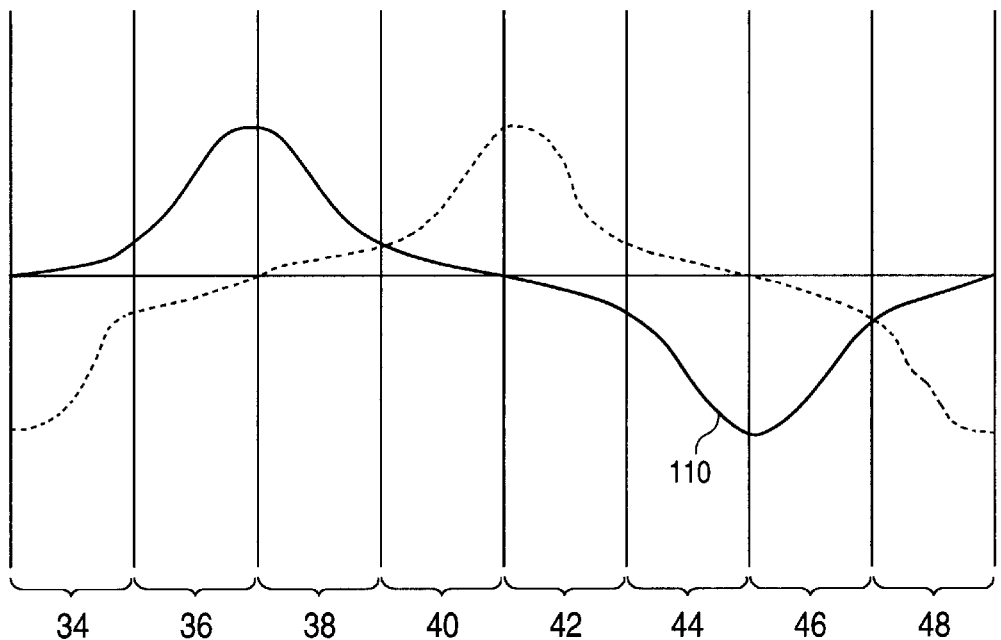
FIGS. 6A and 6B are phase diagrams showing examples of alternate waveforms that may be generated in accordance with the present invention.

In addition, although the above description has focused on generation of cosine and sine waveforms, similar ideas may be used for other types of signals. One example is that multi-phase motor driving may be optimized by the use of non-sinusoidal waveforms. Another example may be seen in FIGS. 6A and 6B. FIG. 6A shows a symmetric waveform 110 approximating a bell curve or Poisson distribution. As with the sine and cosine example discussed above, one memory may store the values of one octant (e.g., one of octants 34, 40, 42 and 48), and another memory may store the values of another octant (e.g., one of octants 36, 38, 44 and 46).

Figure 6B:
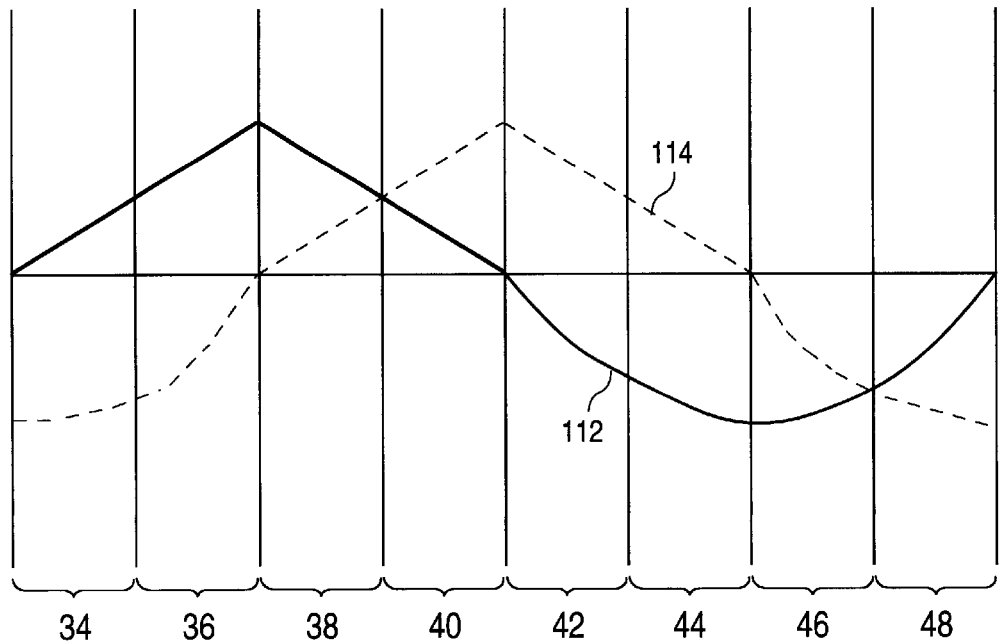

FIG. 6B shows periodic waveforms 112 and 114 that are asymmetric. One memory may store the values of one octant for the waveform 112 (e.g., 34) and one octant for the waveform 114 (e.g., 36), and another memory may store the values of one octant for the waveform 112 (e.g., 36) and one octant for the waveform 114 (e.g., 34). Note that the asymmetric waveform 112 requires a doubled memory size of itself. In order to generate both waveforms in FIG. 6B, many existing implementations would require a further doubling of the memory size or a doubled memory access speed. However, as described above, the present invention generates both waveforms without requiring a further doubling of the memory size or a doubled memory access speed.

As detailed above, the present invention is useful for generating multiple arbitrary waveforms that are similar to each other but offset in time (e.g., phase) from each other. Each waveform is generated by sequentially accessing multiple stored waveform segments. Additional processing of the waveform segments can create dissimilar waveforms from the same stored segments. One constraint is that no two segments can be accessed simultaneously. The number of waveforms that may be generated is limited only by the number of stored waveform segments.

It should be understood that various alternatives to the embodiments of the invention described herein may be employed in practicing the invention. It is intended that the following claims define the scope of the invention and that structures within the scope of these claims and their equivalents are covered thereby.

What is claimed is:

1. A numerically controlled oscillator for providing N number of phase-shifted oscillator outputs, each of which represents a same output waveform shifted in phase, said oscillator comprising:

N number of storage elements, where N is at least two, with each of the storage elements storing data indicative of a different phase segment of the output waveform, with the phase segment being equal to 1/Nth of a quadrant of the output waveform;

addressor means for reading the N number of storage elements to provide N number of storage element outputs, with each of the N number of storage element outputs corresponding only to one of the phase segments; and processor means for receiving the N number of storage element outputs and for producing the N number of phase-shifted oscillator outputs based upon the storage element outputs.

2. The numerically controlled oscillator of claim 1 wherein the output waveform includes first and second half cycles which are non-symmetrical and wherein each of the storage elements is configured to store data indicative of a different phase segment for each of the first half cycles and to store data indicative of a different phase segment for each of the second half cycles.

3. The numerically controlled oscillator of claim 1 wherein the processor means receives the N number of storage element outputs during each period of a sequence of output time periods, with each of the output time periods corresponding to one of the phase segments and wherein the processor means further produces each of the N number of phase-shifted oscillator outputs exclusively from one of the N number of storage elements during each of the output time periods.

4. The oscillator of claim 3 wherein the data stored in each of the storage elements includes data indicative of a plurality of amplitudes of the output waveform.

5. The oscillator of claim 4 wherein the addressor means generates addresses for the storage elements, with the addresses changing during each of the output time periods so that each of the storage element outputs includes a plurality of amplitude values.

6. The oscillator of claim 5 wherein the addressor means produces addresses in a first sequence during one of the output time periods and addresses in a second sequence, opposite the first sequence, in another one of the output time periods.

7. The oscillator of claim 3 wherein the processor means includes a selector configured to select different ones of the storage element outputs to produce one of the N number of phase-shifted oscillator outputs.

8. The oscillator of claim 7 wherein the processor means includes an inverter configured to selectively invert one of the storage element outputs to produce one of the N number of phase-shifted oscillator outputs.

9. The oscillator of claim 1 wherein N is two so that the phase segments are one-half of the quadrant.

10. The oscillator of claim 9 wherein the phase-shifted oscillator outputs include first and second oscillator outputs having a 90 degree phase difference.

11. The oscillator of claim 1 wherein N is three so that the phase segments are one-third of the quadrant.

12. The oscillator of claim 11 wherein the phase-shifted oscillator outputs include first, second and third oscillator outputs having a 60 degree phase difference.

13. A circuit for generating N number of numerically controlled phase-shifted oscillator outputs, where N is at least two, said circuit comprising:

N number of storage elements:

addressor means for reading out each of the N number of storage elements during sequential output time periods, with each of the output time periods corresponding to only $1/(4 \cdot N)$ of a cycle of a waveform represented by one of the oscillator outputs, so as to produce N number of storage element outputs for each the output time periods; and processor means for producing each of the N number of phase-shifted oscillator outputs from a separate one of the storage element outputs during each of the output time periods.

14. The circuit of claim 13 wherein the addressor means is configured to read out each of the N number of storage elements during $(4 \cdot N)$ number of the output time periods to produce the N number of the phase-shifted oscillator outputs which represent one cycle of the waveform.

15. The circuit of claim 14 wherein the addressor means produces a plurality of storage element addresses during each of the output time periods so that each of the storage elements is read out a plurality of times during each of the output time periods.

16. The circuit of claim 15 wherein the plurality of storage element addresses are produced in a first sequence during one of the output time periods and a second sequence, opposite the first sequence, in another of the output time periods.

17. The circuit of claim 16 wherein the processor means selects each of the N number of storage element outputs during different ones of the output time periods to produce each of the phase-shifted oscillator outputs.

18. The circuit of claim 17 wherein the processor means inverts selected ones of the storage element outputs to produce each of the phase-shifted oscillator outputs.

19. A numerically controlled oscillator for providing first and second phase-shifted oscillator outputs, said oscillator comprising:

two storage elements, with each of the storage elements storing data indicative of one of the phase-shifted oscillator outputs during a different phase segment of the one of the phase-shifted oscillator outputs, with the phase segment equal to one octant of the one of the phase-shifted oscillator outputs;

addressor means for reading the storage elements to provide first and second storage element outputs, with each of the first and second storage element outputs corresponding to only one of the phase segments; and processor means for producing each of the first and second phase-shifted oscillator outputs based upon the first and second storage element outputs.

20. The oscillator of claim 19 wherein the stored data indicative of one of the phase-shifted oscillator outputs includes a plurality of values which represent an amplitude of the one of the phase-shifted oscillator outputs during one of the phase segments.

21. The oscillator of claim 20 wherein the addressor means produces a plurality of addresses during each of the phase segments, with each of the storage element outputs including data indicative of the plurality of values.

22. The oscillator of claim 21 wherein the addressor means produces the plurality of addresses in a first sequence during the one of the phase segments and in a second sequence, opposite the first sequence, in another one of the phase segments.

23. The oscillator of claim 22 wherein the processor means includes a selector configured to produce, during one of the phase segments, the first phase-shifted oscillator output by selecting the first storage element output and the second phase-shifted oscillator output by selecting the second storage element output and, during another one of the phase segments, the first phase-shifted oscillator output by selecting the second storage element output and the second phase-shifted oscillator output by selecting the first storage element output.

24. The oscillator of claim 23 wherein the processor means includes an inverter for selectively inverting the first and second storage element outputs to produce the first and second phase-shifted oscillator outputs.

25. A method of producing N number of phase-shifted oscillator outputs, where N is at least two, comprising:

storing N number of sets of data, with each of the sets of data including data indicative of one of the phase-shifted oscillator outputs during a different phase segment of the one of the phase-shifted oscillator outputs, with the phase segment equal to 1/Nth of a quadrant of a waveform represented by the one of the phase-shifted oscillator outputs;

accessing the N number of sets of stored data to provide N number of storage element outputs; and processing the N number of storage element outputs to produce the N number of phase-shifted oscillator outputs.

26. The method of claim 25 wherein the sets of data each include data representing a plurality of values indicative of an amplitude of the one of the phase-shifted oscillator outputs.

27. The method of claim 26 wherein the accessing includes reading out the data representing a plurality of values in a first sequence during one of the phase segments and reading out the data representing a plurality of values in a second sequence, opposite the first sequence.

28. The method of claim 27 wherein the processing includes selecting each of the N number of storage element outputs to produce each of the N number of phase-shifted outputs.

29. The method of claim 25 wherein N is two and the phase-shifted oscillator signals are shifted in phase by 90 degrees.

30. A method of producing N number of phase-shifted oscillator outputs, where N is at least two, comprising:

storing N number of sets of data;

accessing the N number of sets of stored data to provide N number of storage element outputs; and processing, during each output time period of a sequence of the output time periods, a single one of the N number of storage element outputs is used to produce a single one of the N number of phase-shifted outputs, with each of the output time periods corresponding to 1/Nth of a quadrant of a waveform that represents one of the phase-shifted oscillator outputs, so that all of the N number of storage element outputs are used over the sequence to produce all of the N number of phase-shifted oscillator outputs.

31. The method of claim 30 wherein where N is two and wherein, during a first one of the output time periods, a first one of the N number of oscillator outputs is produced by separately processing a first one of the storage element outputs and a second one of the N number of oscillator outputs is produced by separately processing a second one of the storage element outputs, and during a second one of the output time periods, the first one of the N number of oscillator outputs is produced by separately processing the second one of the storage element outputs and the second one of the N number of oscillator outputs is produced by separately processing the first one of the storage element outputs.

* * * * *